US008428651B2

(12) United States Patent
Koizumi et al.

(10) Patent No.: US 8,428,651 B2
(45) Date of Patent: *Apr. 23, 2013

(54) RADIO BASE STATION APPARATUS

(75) Inventors: Daisuke Koizumi, Zushi (JP);
Masayuki Motegi, Yokohama (JP);
Yoshitsugu Shimazu, Kawasaki (JP);
Seizo Onoe, Yokohama (JP); Naoki Nakaminami, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 474 days.

This patent is subject to a terminal disclaimer.

(21) Appl. No.: 12/670,304

(22) PCT Filed: Jul. 23, 2008

(86) PCT No.: PCT/JP2008/063204
§ 371 (c)(1),
(2), (4) Date: Apr. 30, 2010

(87) PCT Pub. No.: WO2009/014146
PCT Pub. Date: Jan. 29, 2009

(65) Prior Publication Data
US 2011/0026931 A1    Feb. 3, 2011

(30) Foreign Application Priority Data

Jul. 24, 2007 (JP) ................................ 2007-192693

(51) Int. Cl.
*H04M 1/00* (2006.01)
(52) U.S. Cl.
USPC ....................... 455/561; 455/127.1
(58) Field of Classification Search .................. 455/561, 455/127.1, 127.2, 127.3, 552.1
See application file for complete search history.

(56) References Cited

U.S. PATENT DOCUMENTS

| 2008/0227413 A1* | 9/2008 | Lindskog | 455/101 |
| 2009/0088102 A1* | 4/2009 | Gan et al. | 455/127.2 |

FOREIGN PATENT DOCUMENTS

| EP | 0734191 A1 | 9/1996 |
| JP | 08-280057 A | 10/1996 |

(Continued)

OTHER PUBLICATIONS

Office Action for Japanese Application No. 2007-192693 mailed Oct. 25, 2011, with English translation thereof (5 pages).

(Continued)

*Primary Examiner* — Phuoc Doan
(74) *Attorney, Agent, or Firm* — Osha Liang LLP

(57) ABSTRACT

A shared transmission/reception apparatus (OF-TRX) includes: a transmission/reception processor section (TRX-B) for a mobile communication system B configured to perform frequency conversion processing on a transmission baseband signal for the mobile communication system B outputted from a signal converter section (E/O), and to output a transmission radio frequency signal for the mobile communication system B; a power level adjuster section (VA) configured to adjust a power level of a transmission radio frequency signal for a mobile communication system A inputted from a transmission/reception processor section (TRX-A) for the mobile communication system A; a combiner section (COM) configured to generate a transmission radio frequency signal by combining the transmission radio frequency signal for the mobile communication system A outputted from the power level adjuster section (VA) and the transmission radio frequency signal for the mobile communication system B outputted from the transmission/reception processor section (TRX-B) for the mobile communication system B; and a common amplifier section (PA) configured to amplify a power level of the transmission radio frequency signal outputted from the combiner section (COM) at a predetermined amplification rate, and to output the resultant signal.

7 Claims, 10 Drawing Sheets

FOREIGN PATENT DOCUMENTS

| | | |
|---|---|---|
| JP | 09-200126 A | 7/1997 |
| JP | 2000-031878 A | 1/2000 |
| JP | 2000-031879 A | 1/2000 |
| JP | 2000-269879 A | 9/2000 |
| JP | 2001-292082 A | 10/2001 |
| JP | 2003-078466 A | 3/2003 |
| JP | 2003-115793 A | 4/2003 |
| JP | 2007-142684 A | 6/2007 |
| WO | 96/11552 A1 | 4/1996 |

OTHER PUBLICATIONS

Patent Abstract for Japanese Publication No. 09-200126 Published Jul. 31, 1997 (1 page).

Patent Abstract for Japanese Publication No. 2000-031878 Published Jan. 28, 2000 (1 page).

Patent Abstrac for Japanese Publication No. 2001-292082 Published Oct. 19, 2001 (1 page).

International Search Report w/translation from PCT/JP2008/063204 dated Aug. 19, 2008 (5 pages).

Written Opinon from PCT/JP2008/063204 dated Aug. 19, 2008 (3 pages).

Office Action for European Application No. 08791461.0 dated Nov. 8, 2012 (7 pages).

* cited by examiner

RADIO BASE STATION APPARATUS

TECHNICAL FIELD

The present invention relates to a radio base station apparatus including a shared transmission/reception apparatus configured to transmit and receive both signals for a first mobile communication system and signals for a second mobile communication system.

BACKGROUND ART

FIG. 1 shows an example of a schematic configuration of a radio base station apparatus 1 for use in a mobile communication system A.

As shown in FIG. 1, the radio base station apparatus 1 includes a modulation/demodulation function section MDE-A for the mobile communication system A, an optical feeder transmission/reception apparatus OF-TRX and an antenna ANT.

Note that, the modulation/demodulation function section MDE-A for the mobile communication system A is located indoors in a station building; the antenna ANT is located outdoors in a high place; and the optical feeder transmission/reception apparatus OF-TRX is located in the vicinity immediately below the outdoor antenna ANT.

In addition, in order to reduce signal transmission loss, optical fiber is used to connect the modulation/demodulation function section MDE-A for the mobile communication system A to the optical feeder transmission/reception apparatus OF-TRX.

In recent years, it has been demanded that a single radio base station apparatus as shown in FIG. 1 should provide services not only in the mobile communication system A, but also in a mobile communication system B having a frequency band close to that of the mobile communication system A.

In order for the radio base station apparatus 1 shown in FIG. 1 to provide services in both the mobile communication system B and in the mobile communication system A as described above, it is conceived, as shown in FIG. 2, that a modulation/demodulation function section MDE-B for the mobile communication system B is added to the configuration of the radio base station apparatus 1 shown in FIG. 1, and that a shared optical feeder transmission/reception apparatus (hereinafter, shared OF-TRX) shared by the mobile communication systems A and B is also added thereto instead of the optical feeder transmission/reception apparatus OF-TRX shown in FIG. 1.

Note that, the modulation/demodulation function section MDE-B for the mobile communication system B is located indoors in the station building, while the shared OF-TRX is located in the vicinity immediately below the outdoor antenna ANT in the same manner as the optical feeder transmission/reception apparatus OF-TRX shown in FIG. 1.

In addition, in order to reduce signal transmission loss, optical fiber is used to connect the shared OF-TRX to the modulation/demodulation function section MDE-A for the mobile communication system A to the modulation/demodulation function section MDE-B for the mobile communication system B.

Patent Document 1: JP-A-2003-115793

DISCLOSURE OF THE INVENTION

However, there have been the following problems when the configuration of the existing radio base station apparatus 1 shown in FIG. 1 is modified to a configuration in which the modulation/demodulation function section MDE-B for the mobile communication system B is added and the OF-TRX shown in FIG. 1 is replaced with the shared OF-TRX in order for the radio base station apparatus 1 shown in FIG. 1 to provide services in both the mobile communication systems A and B, as described above.

Firstly, optical signals exist in a variety of forms, and the modulation/demodulation function section MDE-A for the mobile communication system A may take a configuration including a transmission/reception processor section TRX-A for the mobile communication system A. This results in a problem in cost because a variety of the shared OF-TRXs need to be prepared.

Secondly, if the performance of a common amplifier section PA in the shared OF-TRX is adjusted to suit the mobile communication system B, the mobile communication system A cannot maintain transmission radio frequency signals for the mobile communication system A at the same power level as in the case where the mobile communication system A is operated alone. This poses a problem that the mobile communication system A cannot maintain a service area as large as the area in the singly-operated state.

Thirdly, reception radio frequency signals received by the shared OF-TRX are divided by a divider section DIV into the reception radio frequency signals for the mobile communication system A and the reception radio frequency signals for the mobile communication system B. As a result, there has been a problem that a reception sensitivity of each of the mobile communication systems A and B is reduced.

Accordingly, the present invention has been made in view of the above problems, and an object of the present invention is to provide a radio base station apparatus capable of solving, with a minimum modification, the above-mentioned problems of a reduction in service quality and a very large cost increase along with an increase in variation of the shared OF-TRXs even when the existing radio base station apparatus 1 provides services in both the mobile communication systems A and B.

A first aspect of the present invention is summarized as a radio base station apparatus including a shared transmission/reception apparatus configured to transmit and receive both a signal for a first mobile communication system and a signal for a second mobile communication system, wherein the shared transmission/reception apparatus includes: a signal converter section configured to convert an inputted transmission baseband signal for the second mobile communication system from an optical signal to an electrical signal; a transmission/reception processor section for the second mobile communication system configured to perform frequency conversion processing on the transmission baseband signal for the second mobile communication system outputted from the signal converter section, and to output a transmission radio frequency signal for the second mobile communication system; a power level adjuster section configured to adjust a power level of a transmission radio frequency signal for the first mobile communication system inputted from a transmission/reception processor section for the first mobile communication system; a combiner section configured to generate a transmission radio frequency signal by combining the transmission radio frequency signal for the first mobile communication system outputted from the power level adjuster section and the transmission radio frequency signal for the second mobile communication system outputted from the transmission/reception processor section for the second mobile communication system; and a common amplifier section configured to amplify a power level of the transmission radio frequency signal outputted from the combiner section at a predetermined amplification rate, and to output the resultant signal, and the transmission/reception processor section for the first mobile communication system is not provided in the shared transmission/reception apparatus.

According to the invention, the transmission/reception processor section TRX-A for the first mobile communication system is not provided in the shared OF-TRX. For this reason, even when optical signals exist in a variety of forms or when the modulation/demodulation function section MDE-A for the first mobile communication system may take a configuration including the transmission/reception processor section TRX-A for the first mobile communication system, a variety of the shared OF-TRXs do not need to be prepared.

In addition, according to the invention, when the modulation/demodulation function section MDE-A for the first mobile communication system takes a configuration including the transmission/reception processor section TRX-A for the first mobile communication system and when performance of the common amplifier section PA in the shared OF-TRX is adjusted to suit the second mobile communication system, the radio frequency signals for the first mobile communication system can be outputted, without modifying the existing modulation/demodulation function section MDE-A for the first mobile communication system, at an appropriate power level (i.e., at a power level of the radio frequency signals for the first mobile communication system A in the case where the first mobile communication system is operated alone).

In the first aspect, the transmission/reception processor section for the second mobile communication system can be configured to adjust a power level of the transmission radio frequency signal for the second mobile communication system to be equal to a power level of the transmission radio frequency signal for the first mobile communication system outputted from the power level adjuster section.

According to the invention, areas for both the first and second mobile communication systems can be maintained as large as the areas respectively covered by radio base station apparatuses, and a high service quality can be also maintained over the entire service areas.

In the first aspect, the shared transmission/reception apparatus can include: a first isolator provided between the power level adjuster section and the combiner section; and a second isolator provided between the transmission/reception processor section for the second mobile communication system and the combiner section, the first isolator can be configured to allow only a signal, which goes in a direction from the power level adjuster section to the combiner section, to pass therethrough, and the second isolator can be configured to allow only a signal, which goes in a direction from the transmission/reception processor section for the second mobile communication system to the combiner section, to pass therethrough.

The invention makes it possible to: avoid a situation where the transmission radio frequency signals for the mobile communication system A inputted to a combiner section COM flow in the direction of a transmission/reception processor section TRX-B for the mobile communication system B due to undesired characteristics of the combiner section COM; and avoid a situation where the transmission radio frequency signals for the mobile communication system B inputted to the combiner section COM flow in the direction of the transmission/reception processor section TRX-A for the mobile communication system A due to undesired characteristics of the combiner section COM.

In the first aspect, the shared transmission/reception apparatus can include the transmission/reception processor section for the second mobile communication system, the power level adjuster section, the combiner section, and the common amplifier section, for at least two systems.

As described above, the present invention makes it possible to provide a radio base station apparatus capable of solving, with a minimum modification, the above-mentioned problems a reduction in service quality and a very large cost increase along with an increase in variation of the shared OF-TRXs even when the existing radio base station apparatus 1 provides services in both the mobile communication systems A and B.

BEST MODES FOR CARRYING OUT THE INVENTION (Configuration of Radio Base Station Apparatus According to First Embodiment of Present Invention)

Figure 1:
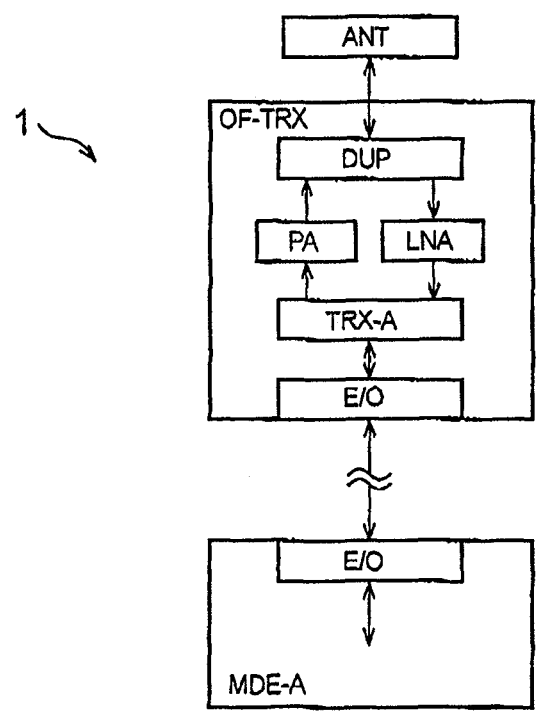
FIG. 1 is a schematic configuration diagram of a conventional radio base station apparatus.
Figure 2:
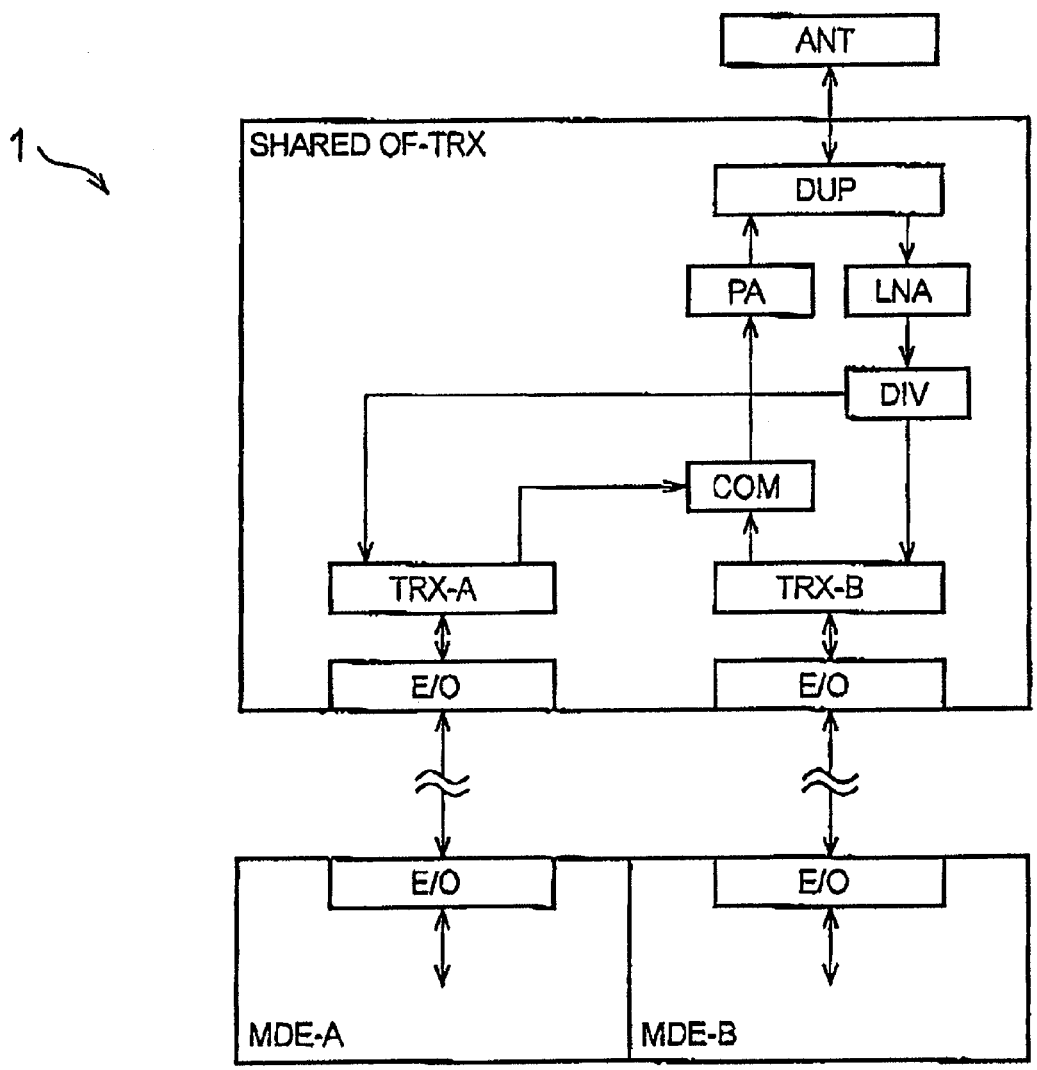
FIG. 2 is a schematic configuration diagram of a conventional radio base station apparatus.
Figure 3:
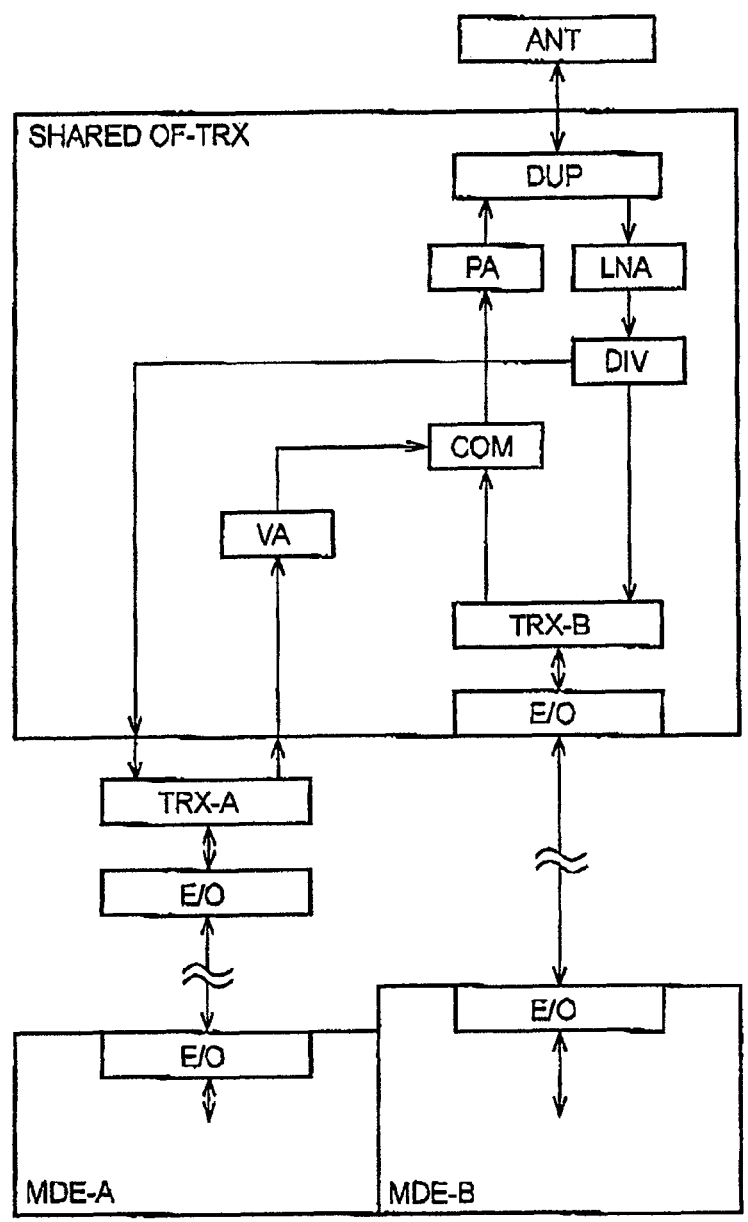
FIG. 3 is a schematic configuration diagram of a radio base station apparatus according to a first embodiment of the present invention.

Referring to FIG. 3, description will be given of a configuration of a radio base station apparatus 1 according to a first embodiment of the present invention.

The radio base station apparatus 1 is configured to provide a service to both a mobile communication system A (first mobile communication system) and a mobile communication system B (second mobile communication system).

For example, the radio base station apparatus 1 according to the present embodiment may be configured to provide a service to: as the mobile communication system A, a mobile communication system of the W-CDMA scheme; and, as the mobile communication system B, a mobile communication system of the LTE (Long Term Evolution) scheme.

Alternatively, the radio base station apparatus 1 according to the present embodiment may be configured to provide a service to: as the mobile communication system A, a mobile communication system of the HSPA (High Speed Packet Access) scheme; and, as the mobile communication system B, a mobile communication system of the LTE scheme.

Still alternatively, the radio base station apparatus 1 according to the present embodiment may be configured to provide a service to: as the mobile communication system A, a mobile communication system of the EVDO (Evolution Data Only) scheme; and, as the mobile communication system B, a mobile communication system of the UMB (Ultra Mobile Broadband) scheme.

To be specific, as shown in FIG. 3, the radio base station apparatus 1 includes a modulation/demodulation function section MDE-A for the mobile communication system A, a transmission/reception processor section TRX-A for the mobile communication system A, a signal converter section E/O for the mobile communication system A, a modulation/demodulation function section MDE-B for the mobile communication system B, a shared optical feeder transmission/reception apparatus (shared OF-TRX) and an antenna ANT.

Note that, the modulation/demodulation function section MDE-A for the mobile communication system A and the modulation/demodulation function section MDE-B for the mobile communication system B are located indoors in a station building; the antenna ANT is located outdoors in a high place; and the transmission/reception processor section TRX-A for the mobile communication system A, the signal converter section E/O for the mobile communication system A, and the shared OF-TRX are located in the vicinity immediately below the outdoor antenna ANT.

The antenna ANT is configured to transmit and receive radio frequency signals to and from mobile stations (not illustrated).

Each of the modulation/demodulation function section MDE-A for the mobile communication system A and the modulation/demodulation function section MDE-B for the mobile communication system B includes a function configured to perform modulation/demodulation processing on transmission/reception signals.

In this regard, the modulation/demodulation function section MDE-A for the mobile communication system A is configured to transmit and receive transmission/reception signals in the form of optical digital signals to and from the signal converter section E/O for the mobile communication system A.

In addition, the modulation/demodulation function section MDE-B for the mobile communication system B is configured to transmit and receive transmission/reception signals in the form of optical digital signals to and from the shared OF-TRX.

The signal converter section E/O for the mobile communication system A is configured to convert transmission baseband signals for the mobile communication system A outputted from the modulation/demodulation function section MDE-A for the mobile communication system A from optical signals to electrical signals.

The transmission/reception processor section TRX-A for the mobile communication system A (transmission/reception processor section for a first mobile communication system) is configured to convert reception radio frequency signals for the mobile communication system A (reception radio frequency signals for the first mobile communication system) to ones with low frequency, and to convert transmission baseband signals for the mobile communication system A (transmission baseband signals for the first mobile communication system) to ones with high frequency.

In this regard, the transmission/reception processor section TRX-A for the mobile communication system A is configured to transmit and receive radio frequency signals to and from the shared OF-TRX.

In addition, the transmission/reception processor section TRX-A for the mobile communication system A is configured to separate and multiplex transmission/reception signals.

The shared OF-TRX includes a transmission/reception duplexer section DUP, a low-noise amplifier section LNA, a divider section DIV, a common amplifier section PA, a combiner section COM, a power level adjuster section VA, a transmission/reception processor section TRX-B for the mobile communication system B (transmission/reception processor section for a second mobile communication system), and a signal converter section E/O.

The signal converter section E/O is configured to receive transmission baseband signals for the mobile communication system B through an optical fiber from the modulation/demodulation function section MDE-B for the mobile communication system B, then to perform conversion from optical signals to electrical signals, and thereby to output the resultant signals to the transmission/reception processor section TRX-B for the mobile communication system B.

In addition, the signal converter section E/O is configured to receive transmission baseband signals for the mobile communication system B outputted from the transmission/reception processor section TRX-B for the mobile communication system B (transmission/reception processor section for the second communication system), then to perform conversion from electrical signals to optical signals, and thereby to output, through an optical fiber, the resultant signals to the modulation/demodulation function section MDE-B for the mobile communication system B.

The transmission/reception processor section TRX-B for the mobile communication system B is configured to perform frequency conversion processing on inputted transmission baseband signals for the mobile communication system B (transmission baseband signals for the second mobile communication system), and to output transmission radio frequency signals for the mobile communication system B (transmission radio frequency signals for the second mobile communication system).

Additionally, the transmission/reception processor section TRX-B for the mobile communication system B is configured to perform frequency conversion processing on inputted reception radio frequency signals for the mobile communication system B (reception radio frequency signals for the second mobile communication system), and to output reception baseband signals for the mobile communication system B (reception baseband signals for the second mobile communication system).

In addition, the transmission/reception processor section TRX-B for the mobile communication system B may include a function to make fine adjustments to a power level of the transmission radio frequency signals for the mobile communication system B, so as to make fine adjustments to an area in which a service is provided by the mobile communication system B.

For example, the transmission/reception processor section TRX-B for the mobile communication system B may be configured to adjust a power level of the transmission radio frequency signals for the mobile communication system B, so that the power level of the transmission radio frequency signals for the mobile communication system B may be equal to a power level of the transmission radio frequency signals for the mobile communication system A outputted from the power level adjuster section VA.

The power level adjuster section VA is configured to adjust the power level of the transmission radio frequency signals for the mobile communication system A outputted from the transmission/reception processor section TRX-A for the mobile communication system A.

In this regard, the power level adjuster section VA is configured to adjust a power level of the transmission radio frequency signals for the mobile communication system A, so that the power level of the transmission radio frequency signals for the mobile communication system A may be adjusted to the lowest power level among power levels of the transmission radio frequency signals for the mobile communication system A outputted from multiple types of the modulation/demodulation function sections MDE-A for the mobile communication system A.

The combiner section COM is configured to generate a transmission radio frequency signal by combining transmission radio frequency signals for the mobile communication system A outputted from the power level adjuster section VA and transmission radio frequency signals for the mobile communication system B outputted from the transmission/reception processor section TRX-B for the mobile communication system B.

Here, in the combiner section COM, each of the power levels of the transmission radio frequency signals for the mobile communication systems A and B is attenuated to half or less.

The common amplifier section PA is configured to amplify, at a predetermined amplification rate, a power level of the transmission radio frequency signal outputted from the combiner section COM, and to output the resultant signal to the transmission/reception duplexer section DUP. In other words, the amount of the level of power having been attenuated in the combiner section COM is compensated in the common amplifier section PA.

The transmission/reception duplexer section DUP is configured to separate and multiplex reception radio frequency signals received via the antenna ANT and transmission radio frequency signals transmitted via the antenna.

In addition, the transmission/reception duplexer section DUP is configured to transmit, via the antenna ANT to a mobile station, a transmission radio frequency signal outputted from the common amplifier section PA.

Moreover, the transmission/reception duplexer section DUP is configured to output, via the antenna ANT to the low-noise amplifier LNA, a reception radio frequency signal received from a mobile station.

The divider section DIV is configured to divide reception radio frequency signals received from the low-noise amplifier section LNA into reception radio frequency signals for the mobile communication system A and reception radio frequency signals for the mobile communication system B, and to output the resultant signals to the transmission/reception processor section TRX-A for the mobile communication system A and the transmission/reception processor section TRX-B for the mobile communication system B, respectively.

Here, each of power levels of the reception radio frequency signals for the mobile communication systems A and B outputted from the divider section DIV is equal to or less than half the power level of the transmission radio frequency signals thereof.

The low-noise amplifier section LNA is configured to amplify, with low noise, the reception radio frequency signals of low power level received by the antenna ANT.

Note that, the low-noise amplifier section LNA can amplify a received power level of radio frequency signals, so that each of power levels of the radio frequency signals for the mobile communication systems A and B outputted from the divider section DIV may be equal to the power level of the reception signals for the mobile communication system A in the case where the radio base station apparatus 1 provides a service only to the mobile communication system A. Here, the low-noise amplifier section LNA may be configured of multiple amplifiers.

In the present embodiment, the radio base station apparatus 1 is configured to provide a service to each of two different mobile communication systems A and B. However, the present invention is not limited to this, and is also applicable to the radio base station apparatus 1 capable of providing a service to three or more of different mobile communication systems. In this case, the present invention can be applied thereto by increasing the number of output branches of the divider section DIV and the number of input branches of the combiner section COM.

(Advantageous Effect of Radio Base Station Apparatus 1 According to First Embodiment of Present Invention)

In the radio base station apparatus 1 according to the first embodiment of the present invention, the transmission/reception processor section TRX-A for the mobile communication system A is not provided in the shared OF-TRX. For this reason, even when optical signals exist in a variety of forms or when the modulation/demodulation function section MDE-A for the mobile communication system A may take such a configuration as to include the transmission/reception processor section TRX-A for the mobile communication system A, a variety of the shared OF-TRXs do not need to be prepared.

Additionally, in the radio base station apparatus 1 according to the first embodiment of the present invention, when performance of the common amplifier section PA is adjusted to suit the mobile communication system B, the radio frequency signals for the mobile communication system A can be outputted at an appropriate power level (i.e., at a power level of the radio frequency signals for the mobile communication system A in the case where the first mobile communication system is operated alone).

In the radio base station apparatus 1 according to the first embodiment of the present invention, areas for both the mobile communication systems A and B can be maintained as large as the areas respectively covered by radio base station apparatuses, and a high service quality can be also maintained over the entire service areas.

In other words, the radio base station apparatus 1 according to the first embodiment of the present invention makes it possible to prevent occurrence of a situation where the overlapping of areas for both the mobile communication systems covered by different radio base station apparatuses 1 increases interference between cells, so that each service area is reduced in size or that a service cannot be provided to an end of each area because radio waves fail to reach the end.

Modified Example 1

Figure 7:
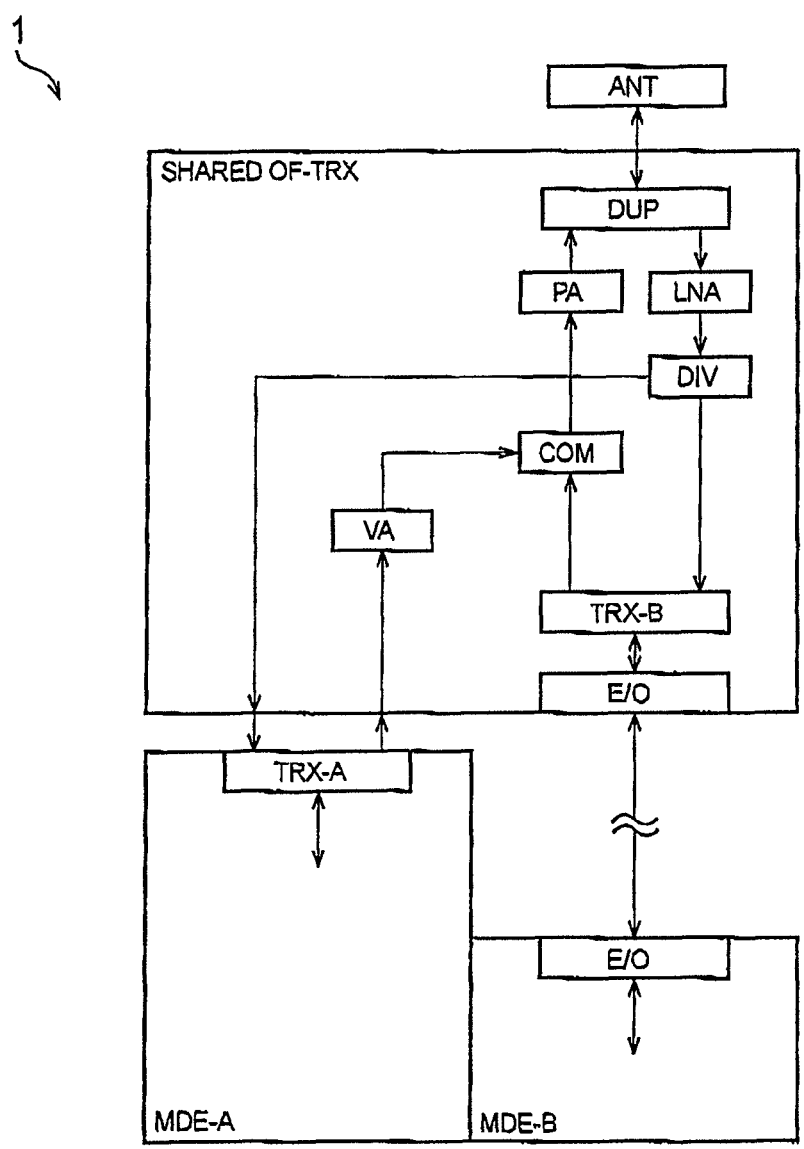
FIG. 7 is a schematic configuration diagram of a modification of the radio base station apparatus according to the first embodiment of the present invention.

The radio base station apparatus according to the above-mentioned first embodiment may take such a that the above-mentioned transmission/reception processor section TRX-A for the mobile communication system A is provided in the modulation/demodulation function section MDE-A for the mobile communication system A, as shown in FIG. 7.

Note that, in the example shown in FIG. 7, the modulation/demodulation function section MDE-A for the mobile communication system A and the shared OF-TRX are provided close to each other, since radio frequency signals are transmitted and received therebetween in the form of electrical signals.

This configuration eliminates the need for the signal converter section E/O provided in the modulation/demodulation function section MDE-A for the mobile communication system A and the signal converter section E/O provided outside the modulation/demodulation function section MDE-A for the mobile communication system A, which are provided in the above-mentioned first embodiment.

Additionally, radio frequency signals for the mobile communication system are transmitted and received, in the form of electrical signals, between the modulation/demodulation function section MDE-A for the mobile communication system A and the shared OF-TRX.

In the radio base station apparatus 1 according to this modified example, the power level adjuster section VA can adjust a power level of the transmission radio frequency signals for the mobile communication system A outputted from the transmission/reception processor section TRX-A for the mobile communication system A. For this reason, it is possible to output transmission signals for the mobile communication system A at an appropriate power level (i.e., at a power level of the radio frequency signals for the mobile communication system A in the case where the mobile communication system A is operated alone) without modifying the existing transmission/reception processor section TRX-A for the mobile communication system A.

(Radio Base Station Apparatus according to Second Embodiment of Present Invention)

Next, referring to FIG. 4, a radio base station apparatus 1 according to a second embodiment of the present invention will be described mainly about the difference from the radio base station apparatus 1 according to the above-mentioned first embodiment.

Figure 4:
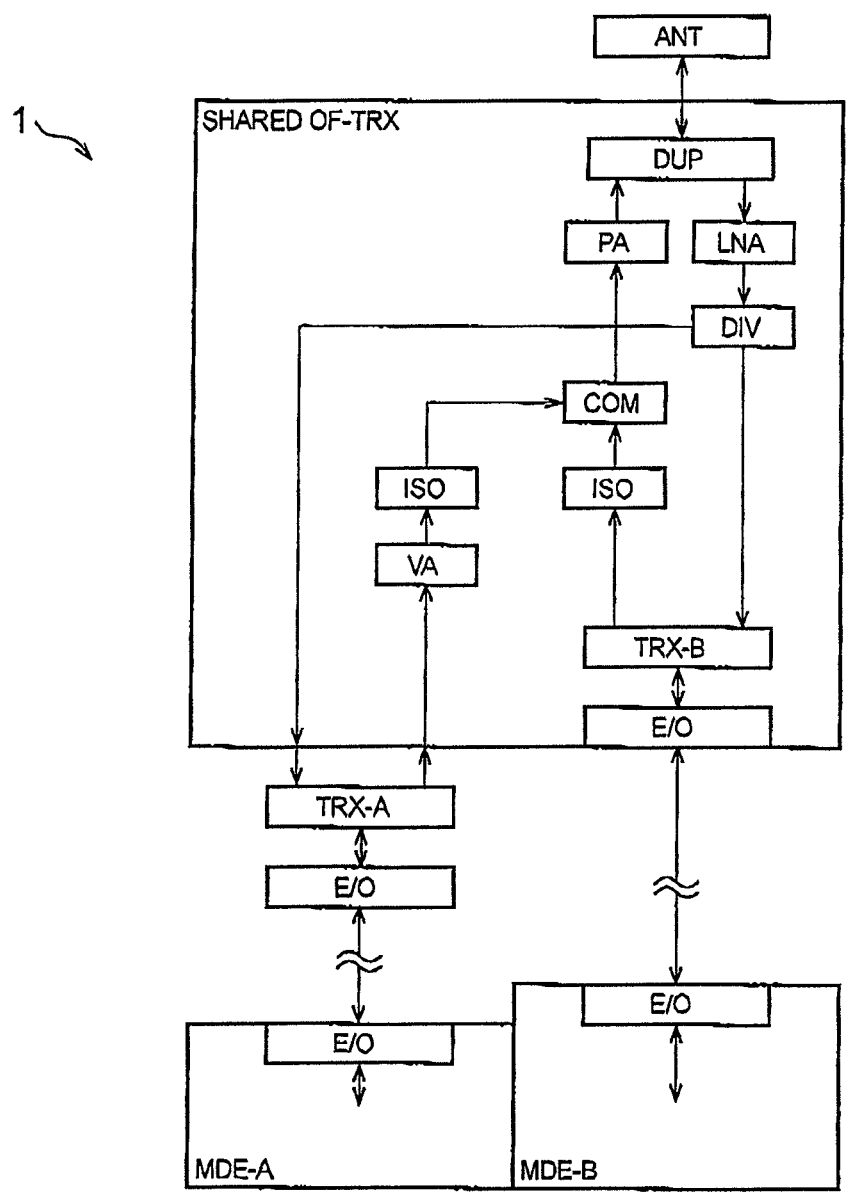
FIG. 4 is a schematic configuration diagram of a radio base station apparatus according to a second embodiment of the present invention.

As shown in FIG. 4, a configuration of the radio base station apparatus 1 according to the present embodiment is the same as the configuration of the radio base station apparatus 1 according to the above-mentioned first embodiment, except that a first isolator ISO #1 and a second isolator ISO #2 are provided in the shared OF-TRX.

To be specific, the first isolator ISO #1 is provided between the power level adjuster section VA and the combiner section COM, and is configured to allow, to pass therethrough, only signals in a direction from the power level adjuster section VA to the combiner section COM.

In addition, the second isolator ISO #2 is provided between the transmission/reception processor section TRX-B for the mobile communication system B and the combiner section COM, and is configured to allow, to pass therethrough, only signals in a direction from the transmission/reception processor section TRX-B for the mobile communication system B to the combiner section COM.

In the radio base station apparatus 1 according to the present embodiment, it is possible to avoid a situation where the reception radio frequency signals for the mobile communication system A inputted to the combiner section COM flow in the direction of the transmission/reception processor section TRX-B for the mobile communication system B due to undesired characteristics of the combiner section COM. In addition, it is possible to avoid a situation where the reception radio frequency signals for the mobile communication system B inputted to the combiner section COM flow in the direction of the transmission/reception processor section TRX-A for the mobile communication system A due to undesired characteristics of the combiner section COM.

Note that, if the reception radio frequency signals for the mobile communication system A inputted to the combiner section COM flow not in the direction of the common amplifier section PA but in the direction of the transmission/reception processor section TRX-B for the mobile communication system B due to undesired characteristics of the combiner section COM, an adverse effect is exerted on the transmission/reception processor section TRX-B for the mobile communication system B, whereby there is a possibility that the radio base station apparatus 1 does not operate properly.

Additionally, the same goes for a case where the reception radio frequency signals for the mobile communication system B inputted to the combiner section COM flow not in the direction of the common amplifier section PA but in the direction of the transmission/reception processor section TRX-A for the mobile communication system A due to undesired characteristics of the combiner section COM.

Modified Example 2

Figure 8:
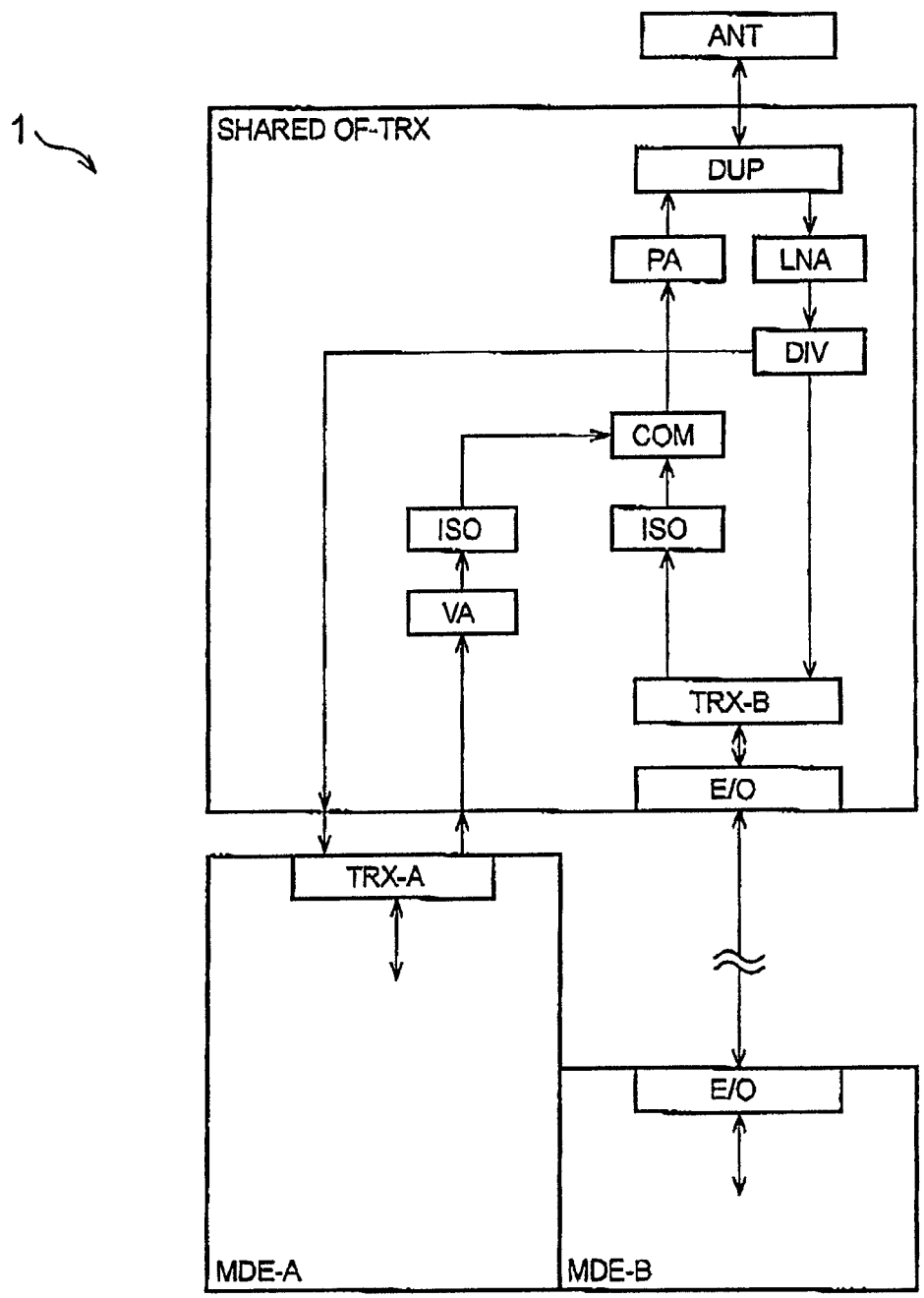
FIG. 8 is a schematic configuration diagram of a modification of the radio base station apparatus according to the second embodiment of the present invention.

The radio base station apparatus according to the above-mentioned second embodiment may take such a configuration that the above-mentioned transmission/reception processor section TRX-A for the mobile communication system A is provided in the modulation/demodulation function section MDE-A for the mobile communication system A, as shown in FIG. 8.

Note that, in the example shown in FIG. 8, the modulation/demodulation function section MDE-A for the mobile communication system A and the shared OF-TRX are provided close to each other, since radio frequency signals are transmitted and received therebetween in the form of electrical signals.

This configuration eliminates the need for the signal converter section E/O provided in the modulation/demodulation function section MDE-A for the mobile communication system A and the signal converter section E/O provided outside the modulation/demodulation function section MDE-A for the mobile communication system A, which are provided in the above-mentioned second embodiment.

Additionally, radio frequency signals for the mobile communication system are transmitted and received, in the form of electrical signals, between the modulation/demodulation function section MDE-A for the mobile communication system A and the shared OF-TRX.

(Radio Base Station Apparatus According to Third Embodiment of Present Invention)

Next, referring to FIG. 5, a radio base station apparatus 1 according to a third embodiment of the present invention will be described mainly about the difference from the radio base station apparatus 1 according to the above-mentioned first embodiment.

Figure 5:
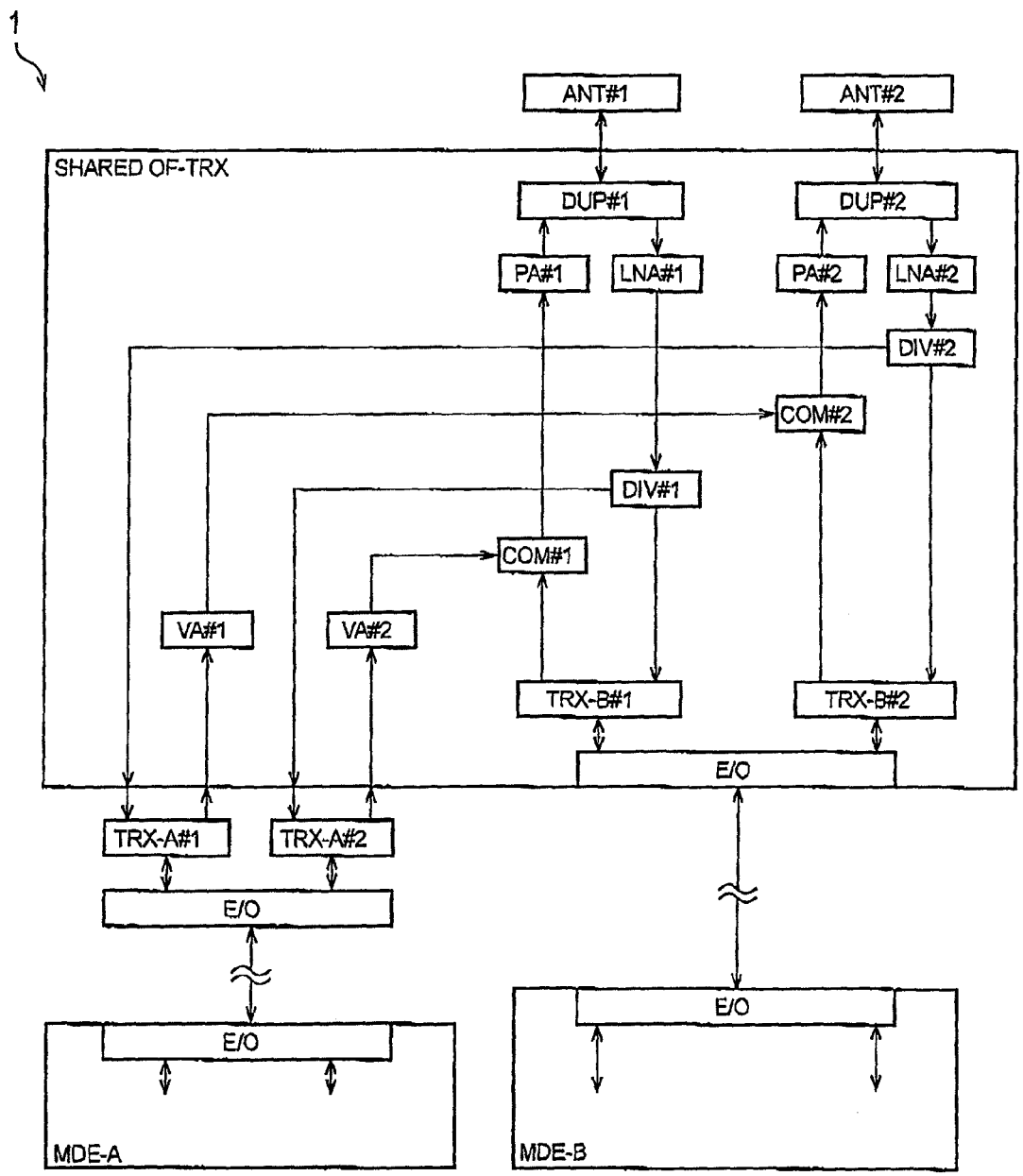
FIG. 5 is a schematic configuration diagram of a radio base station apparatus according to a third embodiment of the present invention.

As shown in FIG. 5, a configuration of the radio base station apparatus 1 according to the present embodiment is the same as the configuration of the radio base station apparatus 1 according to the above-mentioned first embodiment, except that the shared OF-TRX includes transmission configurations and reception configurations for at lease two systems.

To be specific, the radio base station apparatus 1 according to the present embodiment includes two antennas ANT #1 and ANT #2, the shared OF-TRX, two transmission/reception processor sections TRX-A #1 and TRX-A #2 for the mobile communication system A, the signal converter section E/O for the mobile communication system A, the modulation/demodulation function section MDE-A for the mobile communication system A, and the modulation/demodulation function section MDE-B for the mobile communication system B.

Additionally, the shared OF-TRX includes two transmission/reception duplexer sections DUP #1 and DUP #2, two low-noise amplifier sections LNA #1 and LNA #2, two divider sections DIV #1 and DIV #2, two common amplifier sections PA #1 and PA #2, two combiner sections COM #1 and COM #2, two power level adjuster sections VA #1 and VA #2, two transmission/reception processor sections TRX-B #1 and TRX-B #2 for the mobile communication system B, and the signal converter section E/O.

Here, in FIG. 5, a configuration provided with "#1" is a "first system" and a configuration provided with "#2" is a "second system". In addition, functions of a transmission configuration and a reception configuration of the "first system" are basically the same as functions of a transmission configuration and a reception configuration of the "second system". For this reason, descriptions for the respective configurations are omitted.

Note that, in the present embodiment, description has been given of the radio base station apparatus 1 capable of providing services to the two mobile communication systems. However, the present invention is not limited to this, and is also applicable to the radio base station apparatus 1 capable of providing services to three or more of different mobile communication systems.

Modified Example 3

Figure 9:
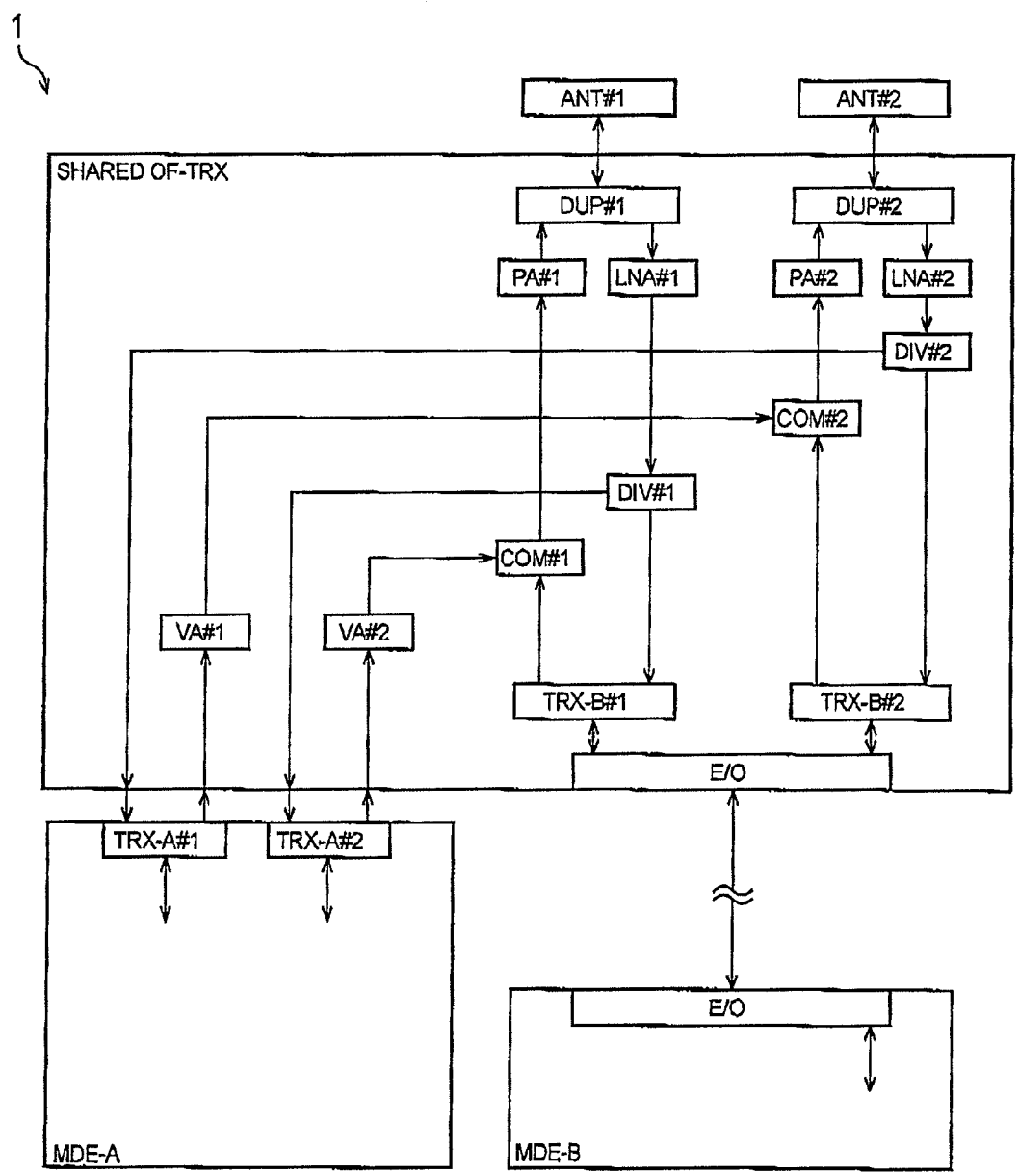
FIG. 9 is a schematic configuration diagram of a modification of the radio base station apparatus according to the third embodiment of the present invention.

The radio base station apparatus according to the above-mentioned third embodiment may take such a configuration that the above-mentioned transmission/reception processor sections TRX-A #1 and TRX-A #2 for the mobile communication system A are provided in the modulation/demodulation function section MDE-A for the mobile communication system A, as shown in FIG. 9.

Note that, in the example shown in FIG. 9, the modulation/demodulation function section MDE-A for the mobile communication system A and the shared OF-TRX are provided close to each other, since radio frequency signals are transmitted and received therebetween in the form of electrical signals.

This configuration eliminates the need for the signal converter section E/O provided in the modulation/demodulation function section MDE-A for the mobile communication system A and the signal converter section E/O provided outside the modulation/demodulation function section MDE-A for the mobile communication system A, which are provided in the above-mentioned third embodiment.

Additionally, radio frequency signals for the mobile communication system are transmitted and received, in the form of electrical signals, between the modulation/demodulation function section MDE-A for the mobile communication system A and the shared OF-TRX.

(Radio Base Station Apparatus according to Fourth Embodiment of Present Invention)

Next, referring to FIG. 6, a radio base station apparatus 1 according to a fourth embodiment of the present invention will be described mainly about the difference from the radio base station apparatus 1 according to the above-mentioned third embodiment.

Figure 6:
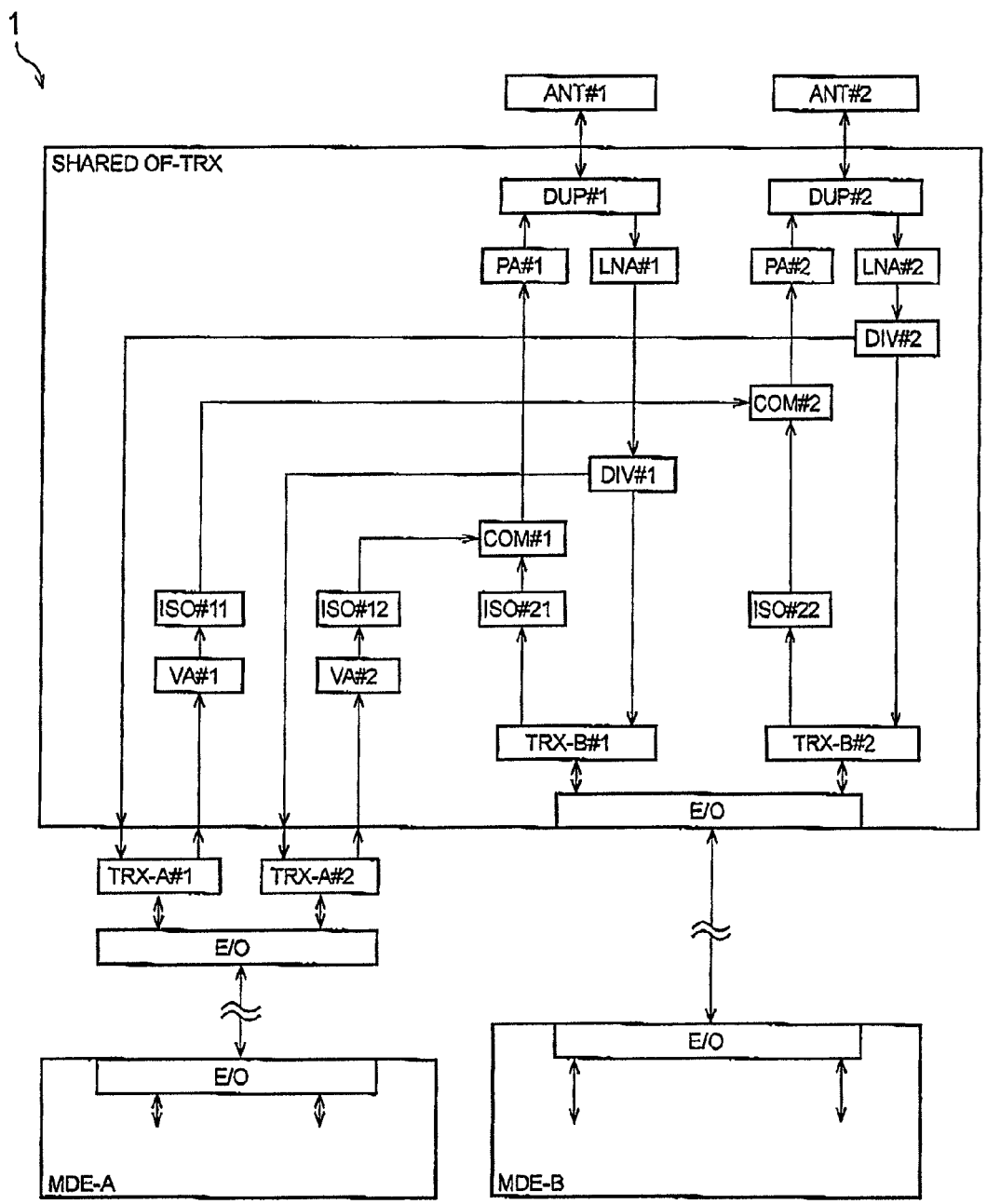
FIG. 6 is a schematic configuration diagram of a radio base station apparatus according to a fourth embodiment of the present invention.

As shown in FIG. 6, a configuration of the radio base station apparatus 1 according to the present embodiment is the same as the configuration of the radio base station apparatus 1 according to the above-mentioned third embodiment, except that first isolators ISO #11 and ISO #12 as well as second isolators ISO #21 and ISO #22 are provided in the shared OF-TRX, in the same manner as the above-mentioned second embodiment.

Modified Example 4

Figure 10:
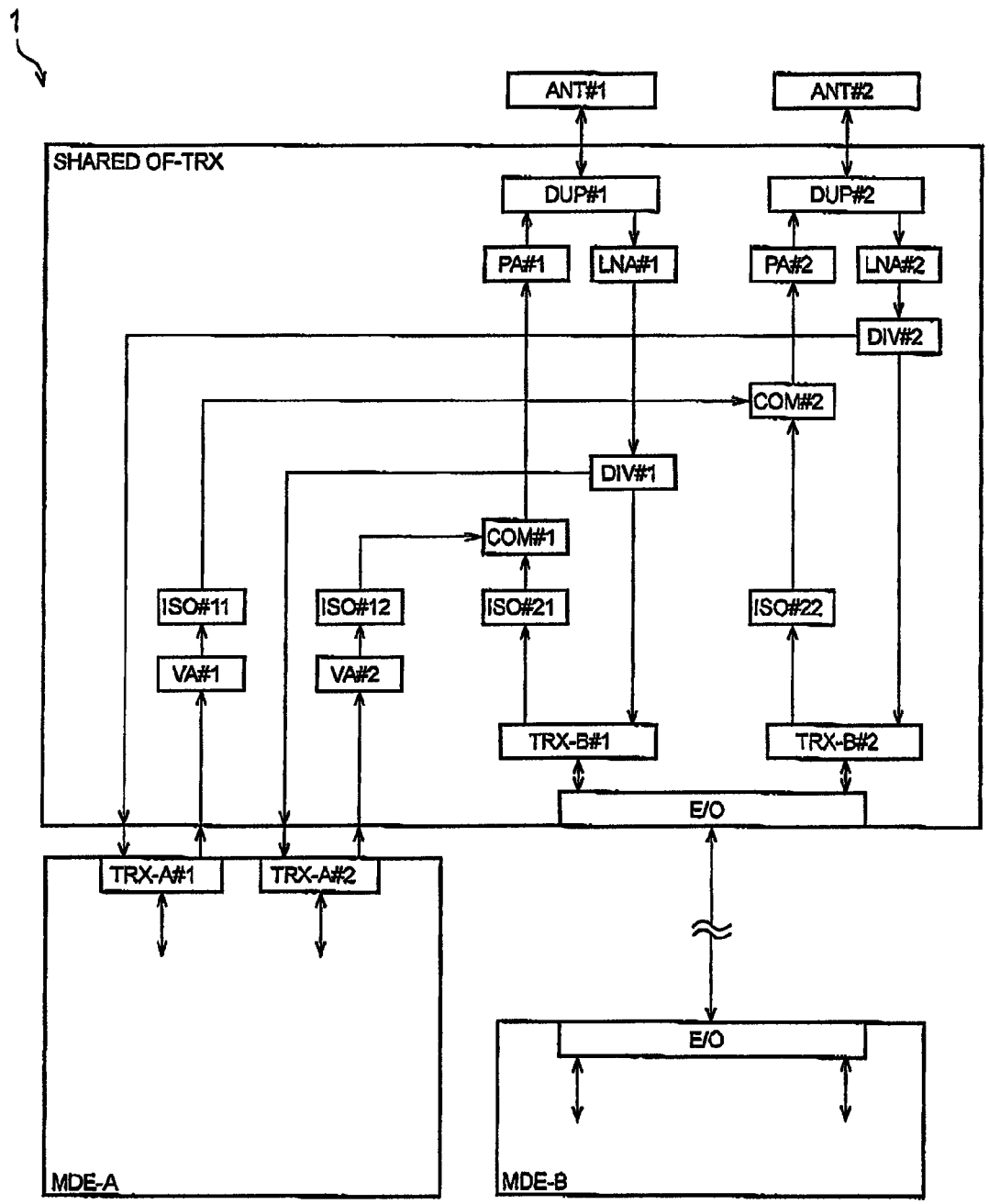
FIG. 10 is a schematic configuration diagram of a modification of the radio base station apparatus according to the fourth embodiment of the present invention.

The radio base station apparatus according to the above-mentioned fourth embodiment may take such a configuration that the above-mentioned transmission/reception processor sections TRX-A #1 and TRX-A #2 for the mobile communication system A are provided in the modulation/demodulation function section MDE-A for the mobile communication system A, as shown in FIG. 10.

Note that, in the example shown in FIG. 10, the modulation/demodulation function section MDE-A for the mobile communication system A and the shared OF-TRX are provided close to each other since radio frequency signals are transmitted and received therebetween in the form of electrical signals.

This configuration eliminates the need for the signal converter section E/O provided in the modulation/demodulation function section MDE-A for the mobile communication system A and the signal converter section E/O provided outside the modulation/demodulation function section MDE-A for the mobile communication system A, which are provided in the above-mentioned fourth embodiment.

Additionally, radio frequency signals for the mobile communication system are transmitted and received, in the form of electrical signals, between the modulation/demodulation function section MDE-A for the mobile communication system A and the shared OF-TRX.

As described above, detailed description has been given of the present invention using the above-mentioned embodiments. However, it is obvious for those skilled in the art that the present invention is not limited to the embodiments explained herein. The present invention can be practiced as modified or altered embodiments within the spirit and scope of the present invention defined by the description of the appended claims. Thus, the description herein is for illustrative purposes, and does not intend to limit the present invention whatsoever.

It should be understood that the entire contents of Japanese Patent Application No. 2007-192693 (filed on Jul. 24, 2007) are herein incorporated by reference.

Industrial Applicability

As described above, a radio base station apparatus according to the present invention is useful because it is capable of solving, with a minimum modification, the above-mentioned problems of a reduction in service quality and a very large cost increase which is caused by an increase in variation of the shared OF-TRXs even when the existing radio base station apparatus provides services in both the mobile communication systems A and B.

The invention claimed is:

1. A radio base station apparatus comprising a shared transmission/reception apparatus configured to transmit and receive both a signal for a first mobile communication system and a signal for a second mobile communication system, wherein the shared transmission/reception apparatus comprises:
a signal converter section configured to convert an inputted transmission baseband signal for the second mobile communication system from an optical signal to an electrical signal;
a transmission/reception processor section for the second mobile communication system configured to perform frequency conversion processing on the transmission baseband signal for the second mobile communication system outputted from the signal converter section, and to output a transmission radio frequency signal for the second mobile communication system;
a power level adjuster section configured to adjust a power level of a transmission radio frequency signal for the first mobile communication system inputted from a transmission/reception processor section for the first mobile communication system;

a combiner section configured to generate a transmission radio frequency signal by combining the transmission radio frequency signal for the first mobile communication system outputted from the power level adjuster section and the transmission radio frequency signal for the second mobile communication system outputted from the transmission/reception processor section for the second mobile communication system; and a common amplifier section configured to amplify a power level of the transmission radio frequency signal outputted from the combiner section at a predetermined amplification rate, and to output the resultant signal, and the transmission/reception processor section for the first mobile communication system is not provided in the shared transmission/reception apparatus.

2. The radio base station apparatus according to claim 1, wherein the transmission/reception processor section for the second mobile communication system is configured to adjust a power level of the transmission radio frequency signal for the second mobile communication system to be equal to a power level of the transmission radio frequency signal for the first mobile communication system outputted from the power level adjuster section.

3. The radio base station apparatus according to claim 2, wherein the shared transmission/reception apparatus comprises:

a first isolator provided between the power level adjuster section and the combiner section; and a second isolator provided between the transmission/reception processor section for the second mobile communication system and the combiner section, the first isolator is configured to allow only a signal, which goes in a direction from the power level adjuster section to the combiner section, to pass therethrough, and the second isolator is configured to allow only a signal, which goes in a direction from the transmission/reception processor section for the second mobile communication system to the combiner section, to pass therethrough.

4. The radio base station apparatus according to claim 2, wherein the shared transmission/reception apparatus comprises the transmission/reception processor section for the second mobile communication system, the power level adjuster section, the combiner section, and the common amplifier section, for at least two systems.

5. The radio base station apparatus according to claim 1, wherein the shared transmission/reception apparatus comprises:

a first isolator provided between the power level adjuster section and the combiner section; and a second isolator provided between the transmission/reception processor section for the second mobile communication system and the combiner section, the first isolator is configured to allow only a signal, which goes in a direction from the power level adjuster section to the combiner section, to pass therethrough, and the second isolator is configured to allow only a signal, which goes in a direction from the transmission/reception processor section for the second mobile communication system to the combiner section, to pass therethrough.

6. The radio base station apparatus according to claim 5, wherein the shared transmission/reception apparatus comprises the transmission/reception processor section for the second mobile communication system, the power level adjuster section, the combiner section, and the common amplifier section, for at least two systems.

7. The radio base station apparatus according to claim 1, wherein the shared transmission/reception apparatus comprises the transmission/reception processor section for the second mobile communication system, the power level adjuster section, the combiner section, and the common amplifier section, for at least two systems.

* * * * *